June 28, 1932. A. D. BOELTER 1,864,888
CAKE PAN
Filed May 6, 1931
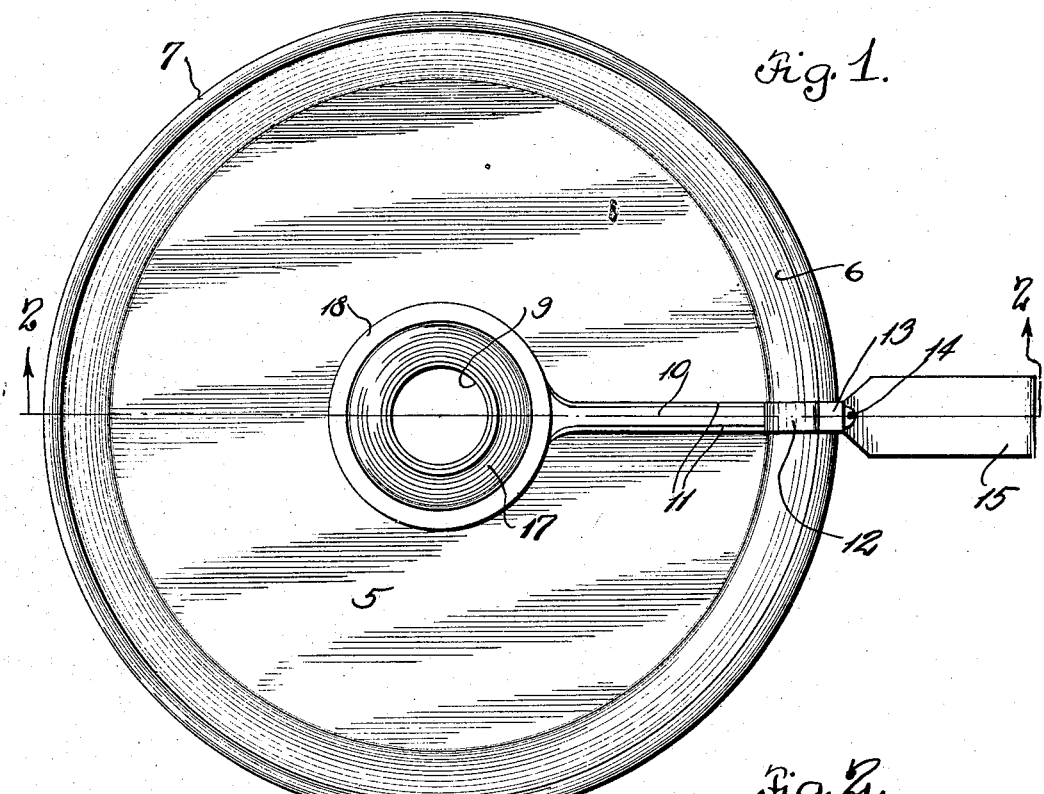
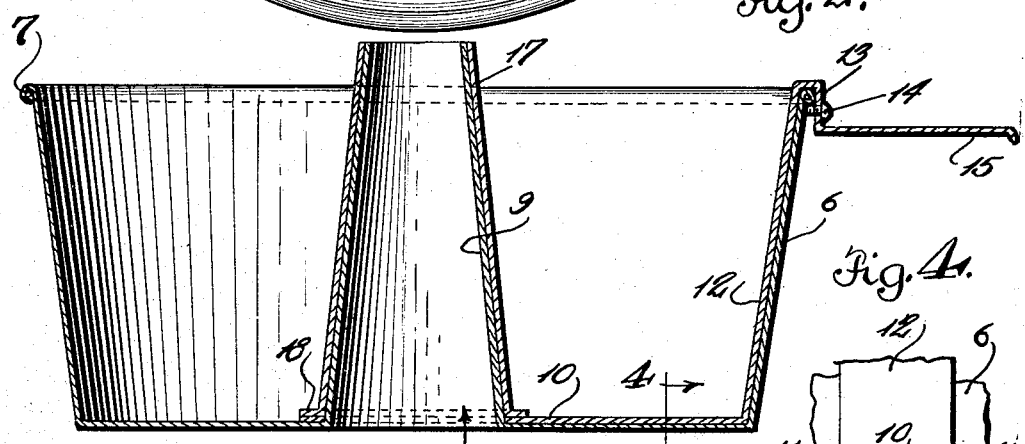
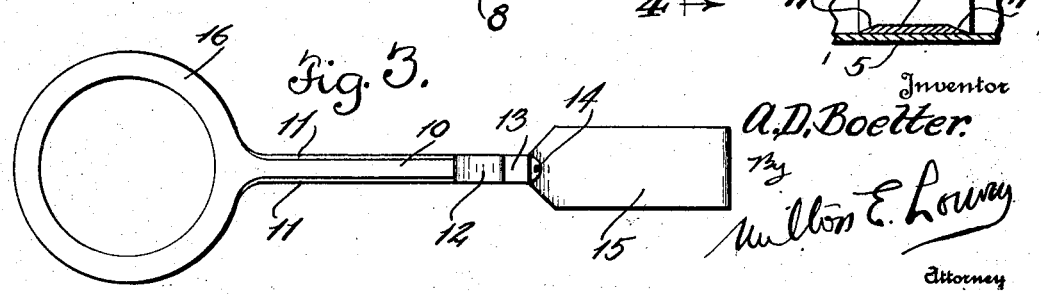

Patented June 28, 1932

1,864,888

UNITED STATES PATENT OFFICE

AUGUST D. BOELTER, OF APPLETON, WISCONSIN

CAKE PAN

Application filed May 6, 1931. Serial No. 535,507.

This invention relates to certain new and useful improvements in cake pans.

The primary object of this invention is to provide a cake pan of the type usually employed in the making of cake known as "angel food" wherein the bottom of the pan is provided with an opening surrounded by an upstanding frusto-conical vent tube or pipe section and having means associated with the pan to facilitate removal of the cake.

The invention refers more particularly to a device associated with a cake pan of the foregoing character and inter-fittingly connected to the central vent tube and rim of the pan and engaged with the inner faces of the bottom and sides of the pan to be moved in a circular path for freeing the cake from the pan where the same may have adhered thereto.

It is a further object of the invention to provide an attachment for cake pans that is movable over the bottom and side walls thereof and which is detachably and movably engaged with the pan rim together with a shield removably fitted upon the central vent tube of the pan and engaged with the inner end of the cake removing device for retaining the latter in position at its inner end and also spacing the cake material from the vent tube.

With the above and other objects in view that will become apparent as the nature of the invention is better understood the same consists in the novel form, combination and arrangement of parts hereinafter more fully described, shown in the accompanying drawing and claimed.

In the drawing:—

Figure 1 is a top plan view of a cake pan equipped with the device of the present invention to facilitate removal of the cake from the pan, the pan being of the type embodying a central vent tube;

Figure 2 is a vertical cross-sectional view taken on line 2—2 of Figure 1, showing the cake removing device interlockingly and rotatably engaged with the rim of the pan and the central vent tube with the shield nested upon the vent tube and resting upon the inner end of the cake removing device;

Figure 3 is a top plan view of the cake removing device; and

Figure 4 is a detail sectional view taken on line 4—4 of Figure 2, showing the knife edge at each side of the lower portion of the cake removing device.

The device of this invention is primarily intended for association with a baking pan of the type embodying a bottom wall 5, an upwardly flaring annular side wall 6 which terminates at its upper edge in an outwardly directed bead 7, while the bottom wall 5 centrally thereof is provided with an opening 8 surrounded by an upstanding frusto-conical vent tube 9.

The primary object of this invention is to provide a device detachably engaged with the pan and is employed to facilitate removal of the cake after being baked from the pan, the device including a bottom blade 10 flatly engaged with the bottom 5 of the pan and having a knife edge 11 at each side thereof as shown in Figures 3 and 4. An angularly directed arm 12 extends from one end of the blade 10 and flatly engages the inner face of the upwardly inclined side wall 6, the arm 12 at its upper end being angularly bent in an outward and downward direction to overlie the pan bead 7 while a set screw 14 threaded in the angle end 13 is disposed beneath the bead 7 to cooperate with the angle end in retaining the device in position, an outwardly directed handle 15 being carried by the angle end 13 to facilitate operation of the device.

A circular frame or ring 16 is carried by the inner end of the blade 10 and is adapted to be placed in surrounding relation to the vent tube 9 and being in the same plane as the blade 10, the ring 16 rests upon the bottom 5 of the pan. A frusto-conical shield 17 is nested upon the vent tube 9 and carries an outwardly directed annular flange 18 at its lower end that rests upon the ring 16 and operates to retain the inner end of the blade 10 and ring in position as well as to prevent the cake material from lying in contact with the vent tube.

To facilitate removal of the cake from the pan, the blade 10 and arm 12 are rotated by the handle 15, this movement being guided by the ring 16 surrounding the vent tube 9 while the blade and arm are retained in wiping engagement with the adjacent faces of the pan by the angle end and screw connection between the arm 12 and pan bead, and also shield 17 resting upon the ring 16, rotation of the device effectively severing any points of adherence of the cake to the inner faces of the pan. The weight of the shield 7 effectively retains the inner end of the device in position while the angle end 13 and associated screw 14 retain the outer end of the device in position. Upon removal of the shield 17 and screw 14, the device may be separated from the baking pan for purposes of cleaning or the like.

While there is herein shown and described the preferred embodiment of the invention, it is nevertheless to be understood that minor changes may be made therein without departing from the spirit and scope of the invention as claimed.

I claim:—

1. In a device of the character described, the combination with a cake pan having a bottom and annular side wall with a central vent tube, of a cake remover comprising parts engaged with the bottom and sides of the pan and having rotatable interlocking engagement with the side wall and vent tube, and a conical shield removably mounted on the vent tube and engaging the inner end of the remover to retain the latter in position.

2. In a device of the character described, the combination with a cake pan having a bottom and annular side wall with a central vent tube, of a cake remover comprising a ring carried by one part surrounding the lower end of the vent tube, a rotatable interlocking connection between the other part and the edge of the side walls, and a conical shield removably mounted on the vent tube and engaging the inner end of the remover to retain the latter in position.

3. In a device of the character described, the combination with a cake pan having a bottom and annular side wall with a central vent tube, of a cake remover comprising a ring carried by one part surrounding the lower end of the vent tube, an angle extension on the other part overlying the upper edge of the side walls of the pan, means in the angle and cooperating with the pan edge to provide a rotatable interlocking connection, and a conical shield removably mounted on the vent tube and engaging the inner end of the remover to retain the latter in position.

In testimony whereof I affix my signature.

AUGUST D. BOELTER.